(12) United States Patent
Schön

(10) Patent No.: US 11,055,992 B2
(45) Date of Patent: Jul. 6, 2021

(54) METHOD FOR ASSISTING A USER IN THE OPERATION OF A MOTOR VEHICLE AND MOTOR-VEHICLE-EXTERNAL DATA SERVER DEVICE

(71) Applicant: Audi AG, Ingolstadt (DE)

(72) Inventor: Torsten Schön, Pietenfeld (DE)

(73) Assignee: Audi AG, Ingolstadt (DE)

( * ) Notice: Subject to any disclaimer, the term of this patent is extended or adjusted under 35 U.S.C. 154(b) by 129 days.

(21) Appl. No.: 16/089,985

(22) PCT Filed: Aug. 11, 2017

(86) PCT No.: PCT/EP2017/070398
§ 371 (c)(1),
(2) Date: Sep. 28, 2018

(87) PCT Pub. No.: WO2018/041601
PCT Pub. Date: Mar. 8, 2018

(65) Prior Publication Data
US 2019/0206246 A1 Jul. 4, 2019

(30) Foreign Application Priority Data
Sep. 2, 2016 (DE) ...................... 10 2016 216 602.6

(51) Int. Cl.
*G08G 1/09* (2006.01)
*G08G 1/01* (2006.01)
(Continued)

(52) U.S. Cl.
CPC ........... *G08G 1/09* (2013.01); *B60H 1/00964* (2013.01); *B60S 1/0818* (2013.01);
(Continued)

(58) Field of Classification Search
CPC ...... G08G 1/09; G08G 1/0112; G08G 1/0129; G08G 1/0133; G08G 1/0141;
(Continued)

(56) References Cited

U.S. PATENT DOCUMENTS 5,812,069 A 9/1998 Albrecht et al.
9,349,287 B1 5/2016 Holzwanger et al.
(Continued)

FOREIGN PATENT DOCUMENTS

CN 102156309 A 8/2011
CN 105469615 A 4/2016
(Continued)

OTHER PUBLICATIONS

International Preliminary Report on Patentability directed to related International Patent Application No. PCT/EP2017/070398, dated Mar. 5, 2019, with attached English-language translation; 15 pages.
(Continued)

*Primary Examiner* — Krishnan Ramesh
(74) *Attorney, Agent, or Firm* — Sterne, Kessler, Goldstein & Fox P.L.L.C.

(57) ABSTRACT

The disclosure relates to a method for assisting a user of a first motor vehicle in the operation of the first motor vehicle, which is located in a geographic region. A motor-vehicle-external data server device (16) divides the geographic region into a plurality of geographic sectors. A sensor device of a second motor vehicle, which is also located in the region, detects at least one measurement value, and a control device of the second motor vehicle transmits a sensor signal describing the measurement value to the motor-vehicle-external data server device. The motor-vehicle-external data server device receives a request signal from the first motor vehicle, which, at the time at which the request signal is transmitted, is not prepared to detect a measurement value of
(Continued)

the same type. If the motor-vehicle-external data service device determines that the motor vehicles are located within the same geographic sector, the motor-vehicle-external data service device transmits the sensor signal to the first motor vehicle.

7 Claims, 3 Drawing Sheets

(51) Int. Cl.
| | |
|---|---|
| *G08G 1/0967* | (2006.01) |
| *H04W 4/024* | (2018.01) |
| *H04W 4/44* | (2018.01) |
| *B60H 1/00* | (2006.01) |
| *B60S 1/08* | (2006.01) |
| *H04W 4/021* | (2018.01) |
| *B60Q 1/20* | (2006.01) |

(52) U.S. Cl.
CPC ......... *G08G 1/0112* (2013.01); *G08G 1/0129* (2013.01); *G08G 1/0133* (2013.01); *G08G 1/0141* (2013.01); *G08G 1/096716* (2013.01); *G08G 1/096741* (2013.01); *G08G 1/096775* (2013.01); *H04W 4/021* (2013.01); *H04W 4/024* (2018.02); *H04W 4/44* (2018.02); *B60Q 1/20* (2013.01); *G08G 1/096791* (2013.01)

(58) Field of Classification Search
CPC ....... G08G 1/096716; G08G 1/096741; B60H 1/00964; B60S 1/0818
USPC .......................................................... 701/36
See application file for complete search history.

(56) References Cited

U.S. PATENT DOCUMENTS

| | | |
|---|---|---|
| 2005/0187714 A1 | 8/2005 | Brulle-Drews |
| 2014/0358412 A1 | 12/2014 | Fausten et al. |
| 2015/0135800 A1 | 5/2015 | Israelsson |
| 2016/0133130 A1 | 5/2016 | Grimm et al. |
| 2017/0236419 A1 | 8/2017 | Grewe |
| 2018/0061129 A1* | 3/2018 | Sisbot .................. G06T 19/006 |
| 2018/0082493 A1* | 3/2018 | Patil ........................ H04Q 9/00 |
| 2018/0218607 A1* | 8/2018 | Baghel .................. G08G 1/161 |

FOREIGN PATENT DOCUMENTS

| | | |
|---|---|---|
| DE | 19513640 A1 | 6/1996 |
| DE | 10139668 A1 | 2/2003 |
| DE | 10219531 A1 | 11/2003 |
| DE | 102008042565 A1 | 4/2010 |
| DE | 102009019075 A1 | 10/2010 |
| DE | 102011084275 A1 | 4/2013 |
| DE | 102014220687 A1 | 4/2016 |
| DE | 102015119495 A1 | 5/2016 |
| DE | 102015000396 A1 | 7/2016 |
| KR | 20080063631 A | 7/2008 |
| WO | WO 2008138734 A1 | 11/2008 |

OTHER PUBLICATIONS

International Search Report and Written Opinion of the International Searching Authority, directed to related International Patent Application No. PCT/EP2017/070398, dated Nov. 13, 2017, with attached English-language translation: 25 pages.

"Mobileye and ST Microelectronics Develop SoC for Autonomous Vehicles," Hansa Automotive, Jun. 1, 2016, with attached English-language translation; 8 pages.

International Search Report and Written Opinion of the International Searching Authority directed to related International Patent Application No. PCT/EP2017/070398, dated Nov. 13, 2017, with attached English-language translation; 17 pages.

* cited by examiner

METHOD FOR ASSISTING A USER IN THE OPERATION OF A MOTOR VEHICLE AND MOTOR-VEHICLE-EXTERNAL DATA SERVER DEVICE

TECHNICAL FIELD

The present invention refers to a method for assisting a user of a motor vehicle while operating the motor vehicle, which is in a geographic region. Some of the steps of the method according to the invention are performed by a motor-vehicle-external data server device, which is able to provide a piece of information or a plurality of pieces of information regarding the weather.

BACKGROUND

Motor vehicles are nowadays provided with a multifaceted sensor system depending on the configuration. This system may for example detect a traffic condition or rain or measure a temperature. In a vehicle fleet, all vehicles are provided with such a sensor system, and all vehicles are provided with a rain sensor, for example. This sensor determines the current rainfall and uses this information for controlling the windshield wiper, for example.

Due to the current wide range of such sensor systems, in particular due to the wide range of sensors for meteorological parameters, such as rainfall, temperature or air moisture, all vehicles are thus provided with many sensor devices, i.e. a large number of devices or components, which are adapted for detecting a physical or chemical characteristic of the environment surrounding the vehicle.

DE 10 2015 119 495 A1 proposes a method for the participative measurement of grip conditions of a road surface, in which such grip data are collected by various vehicles. A central data server collects and processes these data.

The communication between a number of vehicles and a management device as a backend is described in DE 10 2014 220 687 A1, where sensor data of the sensor devices of the motor vehicles are cyclically detected and stored in an environmental model of the database.

The use of a backend as an evaluation unit is also described in DE 10 2011 084 275 A1, where the raw data of a motor vehicle are evaluated and subsequently retransmitted back to the same motor vehicle.

The article of Hansa Automotive (Jan. 6, 2016, Mobileye und ST Microelectronics entwickeln SoC fuer autonome Fahrzeuge") describes sensor systems for fully autonomous vehicles, for example.

DE 101 39 668 A1 describes a method for generating weather and/or road condition information regarding travel routes for a vehicle having a central unit.

In these methods a drawback is found however in that for each vehicle the necessary sensor system has to be installed, since the system has to be provided on each vehicle. Thus vehicle costs and space requirements are increased for each vehicle.

SUMMARY

An object of the invention refers to costs and space requirements.

The object is solved with an inventive method and with the inventive system according to the independent claims. Advantageous developments of the invention are provided by the dependent claims.

The invention is based on the concept of using the respective sensor device already present on a vehicle and transmitting the sensor information to another vehicle or to distribute this information to a plurality of vehicles. This is particularly efficient in the case of a fleet operator. Moreover the respective sensor system may be omitted for the receiving vehicle.

The inventive method for assisting a user of a first motor vehicle while operating the first vehicle, which is within a geographic region, initially comprises the step, performed by a motor-vehicle-external data server device of subdividing the geographic region into a plurality of geographical sectors. The geographic region may for example be a city area or a region. The geographical sector may be indicated as a part of the area. In other words, the geographical sector may be considered as a part of the area.

By means of a sensor device of a second vehicle the detection of at least one measured value may be performed, such as traffic density, average speed, surrounding acoustic level, temperature, air humidity or rainfall. If the measured value is, for example, a weather measurement value, then the measured value is the value of a meteorological parameter, wherein the meteorological parameter is a parameter which describes the weather and/or the weather conditions. The second vehicle is also located in the same region in which the first vehicle is located. A control device of the second vehicle generates a sensor signal, which describes the measured value and a current position of the second vehicle. The current position may for example be described by the geographical coordinates of the second vehicle. A control device is considered to be an apparatus or a component, which is adapted for receiving and generating and transmitting control signals, such as a control chip or a microprocessor. The control device then transmits the sensor signal to the motor-vehicle-external data server device. If the sensor signal describes a weather measurement value, then the sensor signal may also be referred to as a weather signal.

The motor-vehicle-external data server device allows the reception of a request signal from the first motor vehicle, wherein the first motor vehicle at the time of transmitting the request signal is not adapted for detecting a measurement value of the same type, i.e. a measurement value such as of the same meteorological parameter, which is described by the measurement value of the second motor vehicle. The request signal describes a current position of the first motor vehicle. The request signal is to be considered as a signal that requests transmission of a sensor signal to the motor-vehicle-external data server device.

Based on the current positions of the motor vehicles, the data server device determines, whether the motor vehicles are located within the same geographical sector. To this end, the data server device may compare the coordinates of both motor vehicles to the coordinates comprised in the geographic sector and/or in the geographic sectors.

If the first motor vehicle and the second motor vehicle are located within the same geographic sector, then the data server device performs the transmission of the sensor signal to a control device of the first motor vehicle.

Thus a huge financial advantage related to sensor costs, such as for fleet vehicles, is obtained. In other words it is not necessary to provide each vehicle with a sensor device such as for detecting a traffic density or temperature. In a vehicle without the corresponding sensor device also less installation space is required, which may be used otherwise. In this way also other vehicle models or earlier vehicle models may use weather data, even if in these models no corresponding sensor device is provided. Moreover it is not required that both vehicles are in direct proximity to each other, for setting up a vehicle-to-vehicle communication connection.

In vehicle fleets, such as a taxi company or in the totality of a vehicles produced by a certain manufacturer, such a cost savings is huge. The user of the first vehicle experiences an increase of driving comfort, and also an increase of driving safety, since data are provided which cannot even be collected by the vehicle, or which cannot be detected by the vehicle at the time of transmission of the request signal.

In a vehicle fleet with more than two vehicles, thus there may be a plurality of vehicles, whose respective sensor device is adapted for detecting the corresponding parameter, such as the meteorological parameter, and vehicles, whose sensor device is deactivated or that lack such a sensor device.

In order to provide a comprehensive coverage with active sensor devices, the motor-vehicle-external data server device performs the determination of a respective number of vehicles in at least one of the geographic sectors, wherein each of the vehicles is adapted for detecting a measurement value of the same type. Thus an overview is provided about the level of coverage of the individual sectors with rainfall sensors, for example. If the determined number of vehicles drops below a predetermined minimum number, the generation of a control signal for controlling one of the vehicles is performed, in order to increase the number of vehicles, which are adapted for detecting the measurement value of the same type.

According to an embodiment of the inventive method, a sensor device of the first motor vehicle may detect at least one measurement value of another type, i.e. such as a measurement value of another meteorological parameter, different from the meteorological parameter, which is described by the measurement value of the sensor device of the second motor vehicle. If the sensor device of the second motor vehicle detects rainfall, for example, then the sensor device of the first motor vehicle may detect a temperature, for example. If the sensor device of the second motor vehicle detects a traffic density, for example, then the sensor device of the first motor vehicle may detect an average speed and/or a line, for example. In other words, the sensor device of the first motor vehicle detects a measurement value of another type in the same category. The control device of the first motor vehicle performs the generation of a sensor signal, which describes the measurement value of the other type and the current position of the first motor vehicle. The sensor signal of the first motor vehicle may then be transmitted to the motor-vehicle-external data server device.

The motor-vehicle-external data server device may perform the reception of a request signal from the second motor vehicle, wherein the second motor vehicle at the time of transmission of the request signal, is not adapted for detecting a measurement value of the other type, and wherein the request signal describes a current position of the second motor vehicle. In other words the sensor device of the second motor vehicle is not adapted, for example, for detecting a temperature.

If the first motor vehicle and the second motor vehicle are located within the same geographic sector, the transmission of the sensor signal is performed to the control device of the second motor vehicle.

Due to this "swapping" of sensor signals, each of the two motor vehicles may supplement weather data, which cannot be temporarily detected by their own sensor device.

In an embodiment, the determination of the respective number of motor vehicles may occur within at least two of the geographic sectors, wherein each motor vehicle is adapted to detect a measurement value of the same type. Preferably, the data server device may determine the respective number in all geographic sectors.

When the determined number of motor vehicles in a first of the at least two sectors drops below the predetermined minimum number, then the control signal may be a navigation signal, which may describe the navigation of the motor vehicles from another of the at least two geographic sectors into the first sector. The control signal may be transmitted to the motor vehicle in the other sector. This allows an increase of the number of motor vehicles adapted for detecting the measurement value of the same type in the first sector.

In this way, a most uniform distribution of motor vehicles with correspondingly adapted sensor devices takes place. This also allows for example the organization of driving orders in a vehicle fleet. Also a taxi company or a carsharing company may for example organize its driving orders by means of this development, so that those vehicles, whose sensor device is not adapted for detecting the measurement value, are provided, if possible, in each geographic sector, with a sensor signal of the second motor vehicle.

It may also happen, for example, that an already present sensor device of the first motor vehicle is not adapted for detecting the measurement value, because the sensor device at the time of transmission of the request signal may be deactivated, for example. The number of motor vehicles in one sector, which are adapted for detecting the measurement value of the same type, may then be increased, according to another embodiment, or according to an addition to the preceding embodiment. If the first motor vehicle and the second motor vehicle are not located within the same geographic sector, the transmission of the generated control signal to the first motor vehicle may occur, wherein the control signal may be an activation signal, which may describe the activation of a sensor device of the first motor vehicle for detecting the measurement value. The activation signal may for example activate a rainfall sensor.

Both embodiments advantageously improve an area coverage with correspondingly equipped motor vehicles, and thus the validity of the received sensor signals is increased.

In order to obtain a particularly dynamic and flexible distribution of vehicles and also an increase of the quality of an indication of the sensor signal, according to a further embodiment of the inventive method, the division of the region into geographic sectors may occur in accordance with a type of measurement value, wherein the type of measurement value may define a size or dimension of the geographic sector.

The size of a geographic sector may be determined, for example, by means of meteorological empirical values and knowledge. If for example the measurement value describes a rainfall, then a sector size corresponding to a radius of two km may be reasonable. If the measurement value describes a temperature, for example, it may for example be sufficient if the geographic sector has a radius of four km. Since a rainfall is often a very localized event, the reliability and relevance of a received sensor signal are higher, if the same is emitted within the exemplary radius of two km.

In the above case in which both motor vehicles each transmit a sensor signal to the data server device, and where the sensor signals describe different types of measurement value, the data server device may divide the region differently for each measurement value. In this embodiment, the data server device may thus vary the size of the sector depending on a request signal, for example depending on whether the request signal describes a request regarding a rainfall or a request regarding a temperature.

The division of the region into geographic sectors may be performed, as an alternative or as an addition, depending on the geographic property of the surroundings of the second motor vehicle and/or on a natural or artificial boundary of the surroundings with the determined property. A geographic property may for example be a type of land. A natural boundary may for example be a sea shore, a deep gorge or a mountain range or a wood edge around a wood. Examples of an artificial boundary of an area are for example the city edge and the initial and final end of a tunnel. It is considered in this case that such boundaries or properties influence for example the microclimatic conditions or the weather or a weather condition. For example, within a large city the temperature is generally higher than in the surrounding land. Alternatively, the size of the sector may depend, for example, on its tendency to form lines, such that a sector may delimit a road stretch comprising sharp bends or a heavily trafficked highway crossing.

The data server device may advantageously perform, depending on the type of measurement value described by the control signal, the generation of a control signal for activating a windshield wiper and/or an air conditioning unit and/or a fog light. The measurement value may then be a weather measurement value and the sensor signal may be a weather signal. The control signal may then be transmitted to the first motor vehicle. Thus, the exemplary windshield wiper may be automatically controlled, even if the first motor vehicle is lacking a rain sensor. In this way the driving comfort and the driving safety are considerably improved.

The object described above is also obtained by a system with a first motor vehicle, a second motor vehicle and a motor-vehicle-external data server device, wherein the second motor vehicle has a sensor device for detecting at least one measurement value and is adapted for generating a sensor signal and for transmitting the same to the motor-vehicle-external data server device. The first motor vehicle is adapted for transmitting a request signal to the motor-vehicle-external data server device, where the first motor vehicle at the time of the transmission of the request signal is not adapted for detecting the measurement value of the same type. The motor-vehicle-external data server device of the system is adapted for performing the steps related to the motor-vehicle-external data server device according to a method of any of the previously described embodiments. Above said advantages are thus obtained.

One or more of the motor vehicles may then be preferably a car, preferably a passenger car. The data server device 16 may for example be a so called "back end".

Above said object is also achieved by a motor-vehicle-external data server device, which may be provided with a processing device, where the data server device or the optional processing device are adapted for performing the steps related to the data server device of an embodiment of the inventive method. The processing device may be provided to this end with at least one microprocessor and/or at least one microcontroller. The processing device may also be provided with a program code, which is adapted for performing, during execution by the processing device, the steps related to the data server device of an embodiment of the inventive method. The program code may be stored in a data storage of the processing device.

The invention is explained again in the following, based on the accompanying drawings, by means of concrete exemplary embodiments. The examples explained below are preferred embodiments of the disclosure. In the exemplary embodiments, however, the described components of the embodiments represent respective individual and independent characteristics of the disclosure, which also develop independently from each other, and thus should be considered individually or in a combination different from the combination shown, as components of the disclosure. The described embodiments may also be complemented with further ones of the already described characteristics of the disclosure. Functionally equivalent elements in the figures are provided with the same reference numerals.

DETAILED DESCRIPTION

Figure 1:
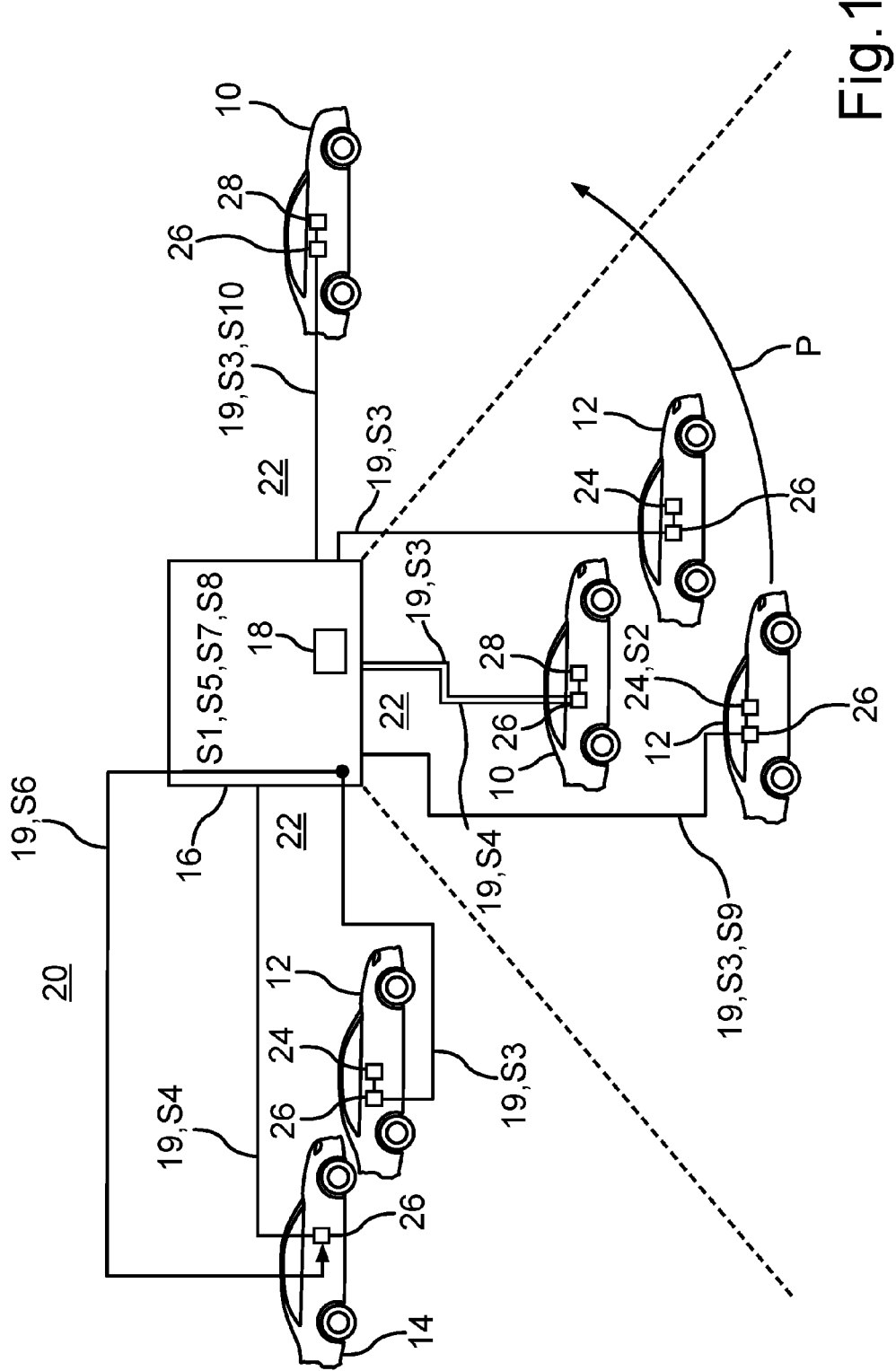
FIG. 1 shows a schematic view of an embodiment of the inventive method.

FIG. 1 shows the principle of the inventive method. FIG. 1 shows a plurality of motor vehicles 10, 12, 14. FIG. 1 also shows a motor-vehicle-external data server device 16, which for example may be formed by an internet server or a computer, and may comprise a processing device 18, for example. The processing device 18 may be provided with a microprocessor and/or a microcontroller, for example.

In a first step S1, in the method, the data server device 16 divides a geographic region 20 in a plurality of geographic sectors 22 (separated by dashed lines in FIG. 1). The geographic region 20 may be defined, for example, by its geographical coordinates, and may comprise, for example, a region or a city area. By means of a suitable algorithm, this region may then be divided into sectors 22, wherein for example also boundary coordinates may be defined. Such a subdivision may be performed, for example, in that a projected surface of region 20 may be subdivided into sectors 22. The division S1 may alternatively or additionally occur for example by means of a map or based on map data.

The criterion for division S1 into geographical sectors 22 may for example be based on the type of measurement value, which is detected (S2) by one of the motor vehicles 10, 12 and which is transmitted to the data server device 16 (S3).

In the following examples, the measurement value may be a weather measurement value and the sensor signal may be a weather signal. Alternatively, the measurement value may for example be a traffic density or a line or an average speed.

In the example of FIG. 1, the motor vehicles 12 are provided, for example, with a respective sensor device 24, which may comprise a rain sensor and detect a rainfall. Suitable sensors are known to the skilled in the art. The sensor device 24 may acquire the detected measurement value, such as for example, a rainfall, in percentage, and transform the measurement value into an electronic signal, which is transmitted (S3) through a control device 26, which may be a control chip or a control circuit, via a data communication connection 19 to the data server device 16, for example. The data communication connection 19 may be a vehicle-to-X link or preferably an internet connection. In general other wireless signal transmission paths or wired signal transmission paths may also be considered.

In contrast to the example of a temperature, a rainfall may often be a very locally defined event, so that in the example, it may be reasonable to divide the region into geographic sectors 22 having a smaller size. In the example of FIG. 1, the sectors 22 may for example be defined as areas around the motor vehicle 12 transmitting the sensor signal, having for example a radius of two kilometers. For a sensor signal of a motor vehicle 10 in the middle sector 22 of FIG. 1, which may describe a temperature, for example, the sectors 22 may have a larger size. The motor vehicle 10 may be provided, in this example, with a sensor device 28, which is adapted for detecting the corresponding measurement value of another type, such as a temperature and be provided, to this end, with a conventional temperature sensor, which is known to the skilled in the art.

Alternatively, for example, the central geographic sector 22 may be a city area, the left geographic sector 22 may be an area near a sea or river shore, and/or the right geographic sector 22 may be a wooden area or a gorge, for example. These natural and artificial boundaries may be based, for example, on meteorological experimental values, where it is known, for example, that within a city area the temperature tends to be higher than in the surrounding periphery, that a shore area of a sea or river may be influenced by the nearby weather situation over the water surface, in that for example temperatures on the river, due in general to the water surface, are lower than in a region, which is at a greater distance from the river.

In the example of FIG. 1, for example, the motor vehicle 14 has no sensor device 24, 28 or it may have a sensor device 24, 28, which at the current time may be deactivated, for example. The motor vehicle 14 generates, for example by means of a control device 26, a request signal and transmits the request signal to the data server device 16 (S4). In the example of the central geographic sector 22, the motor vehicle 10 may be provided, for example, with a sensor device 28, which, as already described, may be adapted for detecting a temperature. This motor vehicle 10 may then transmit, on one side, a temperature value and for example, additionally transmit a request signal for requesting a rainfall value to the data server device (S3, S4).

Both the sensor signal and the request signal additionally describe the respective current position of the motor vehicle 10, 12, 14 which is emitting the respective signal. The current geographic position may for example be detected and provided by a navigation device of the motor vehicle 10, 12, 14. A navigation device is an apparatus or a component of the apparatus for navigation, such as on the basis of GPS signals. This current position may then describe the geographic coordinates, for example.

In step S5 of the method, the data server device 16 determines, based on these current positions, whether the motor vehicle 10, 14 sending the request signal and a motor vehicle 12 transmitting a sensor signal are located within the same geographic sector. To this end, the coordinates may be compared for example with map data, which may be stored, for example, in the data server device 16, wherein in these map data for example, also the boundaries of sectors 22 may be listed or described.

In the example of FIG. 1, the data server device 16 may determine (S5), for example, that the motor vehicle 14 and the motor vehicle 12 are located in the left sector 22. Thereafter, the data server device 16 transmits the sensor signal of motor vehicle 12 in the left sector 22 to the motor vehicle 14 in the left sector 22 (S6).

The transmission of the sensor signal to the motor vehicle 14 (S6) may for example occur through an Internet connection between the data server device 16 and the motor vehicle 14. The motor vehicle 14, which receives the sensor signal of the other motor vehicle 12, may then emit, for example, by means of the control device 26 and a display, a corresponding weather alert or weather advisory. As an alternative or in addition, it may be foreseen, that the data server device 16 generates a control signal (S7) and may transmit (S6) this control signal to the motor vehicle 14. The control signal, which may be received by the control device 26, may describe for instance the activation of a windshield wiper. In the motor vehicle 14 of the left sector 22 the windshield wiper may then be activated, although the motor vehicle 14 is not provided with a corresponding sensor. If for example a sensor signal is transmitted to a motor vehicle 12, 14, which may describe a temperature, then the control signal may control an air conditioning unit, for example. If the sensor signal describes a thick fog, then the control signal may activate a fog light, for example.

In sector 22, which is shown at the center in FIG. 1, two motor vehicles 12 are present, for example, which may be provided with a respective sensor device 24 for detecting the same type of measurement value, such as rainfall, for example. In the right sector 22, a motor vehicle 10 is located, for example, which may be provided with a sensor device 28, which is adapted for recording a measurement value of another meteorological parameter, such as temperature. According to an exemplary embodiment, the data server device 16 may determine, at step S8, within each geographic sector 22 a corresponding number of motor vehicles 12 having a rain sensor.

To this end, a plurality of received sensor signals, which may be associated, according to position information, to motor vehicles 12, may be counted. In the central sector 22, the data server device 16 may then count two signals, for example, and therefore deduce the presence of two motor vehicles 12, while no such sensor signal is received from the right sector 22.

In the present example, the requesting motor vehicle 10 of the right sector 22 has a sensor device 28, but this may only be configured for temperature measurements. In the data server device 16, for example, in a data storage (not shown in FIG. 1) the information may be stored, according to which, with reference to a motor vehicle density, a qualitatively valuable indication regarding a rainfall may be obtained if at least one motor vehicle 12 is located in sector 22 (S8), and thus it may determine that in the example of FIG. 1, the number of motor vehicles in the right sector is too low.

The data server device 16 may then generate a control signal, for example, and transmit the same to motor vehicle 12 provided with the rain sensor (S9). This signal may preferably be a navigation signal, which may describe a travel route from the current location of motor vehicle 12 to the sector on the right side, for example. As indicated by arrow P, the motor vehicle 12 may then automatically be driven by the control device 26 of motor vehicle 12 into the right sector 22. Alternatively it may be conceived that the navigation signal may be displayed for example on the display of the data server device 16, for example if the data server device 16 is located at a car leasing company or a taxi company. A motor vehicle 12 with the corresponding sensor device 24 may then be selected by the taxi company, for example, if a client of the taxi company orders a trip to the right sector 22.

Such a motor vehicle 10 having a sensor device 28 for detecting a temperature, for example, i.e. for detecting another measurement value, is also shown in the central sector 22, as an example. By using the already described method, this motor vehicle 10 may also transmit the detected temperature value to the data server device 16 (S3), and may receive, at the same time, a sensor signal regarding the rainfall (S4). In other words, the data server device 16 provides an "exchange" of sensor signals.

FIG. 1 also schematically shows an example of an inventive system with a first motor vehicle 10, 14, a second motor vehicle 10, 12 and the data server device 16.

Figure 2:
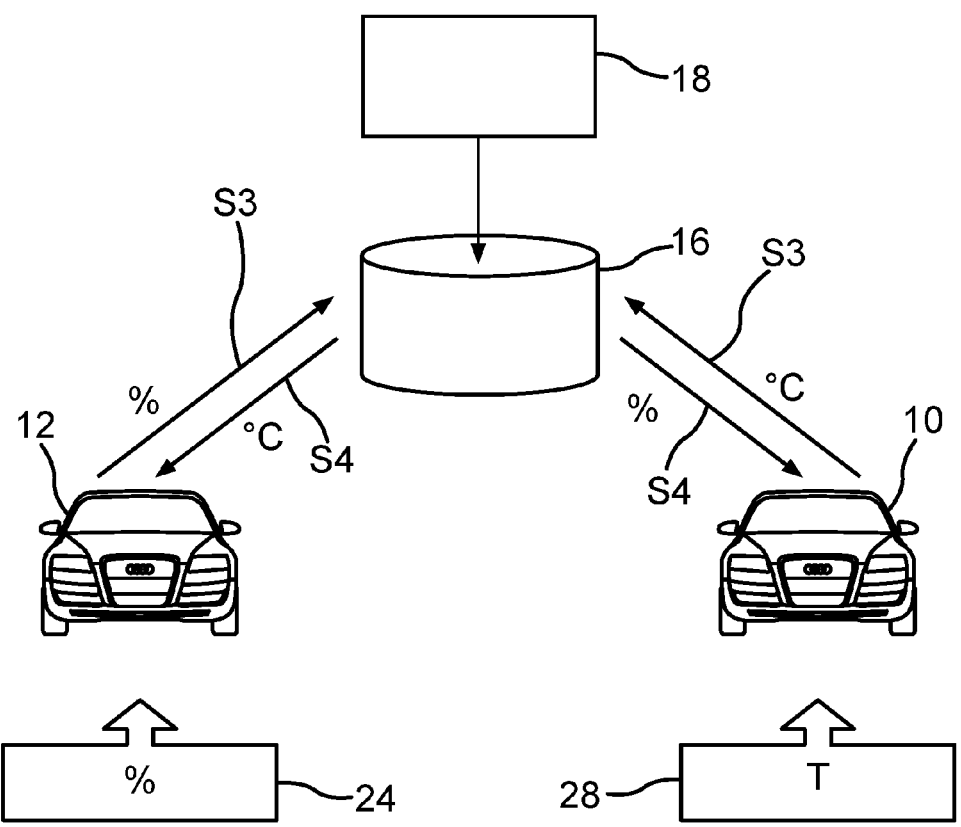
FIG. 2 shows a schematic view of another embodiment of the inventive method.

In FIG. 2, a further example of the inventive method and of the inventive system is shown. The motor vehicle 10 may transmit a temperature measurement value "° C.", and motor vehicle 12 may transmit a rainfall quantity "%" to the data server device 16 (S3). On the other hand, motor vehicle 10 may receive the sensor signal of motor vehicle 12 regarding the rainfall quantity ("%") (S4), and motor vehicle 12 may obtain (S4) from motor vehicle 10 through data server device 16 the sensor signal regarding temperature ("° C.").

The sensor devices 24 and 28 are indicated with "T" for "temperature" and "%" for "quantity of rainfall". For the sake of clarity the sensor devices 24, 28 are not shown within the motor vehicles 10, 12, although they are components of the respective motor vehicle 10, 12 also in the illustration of FIG. 2. The data server device 16 may optionally have a processing device 18, which may be provided with a computer software. Such an optional coordination software may then execute the inventive method with reference to the steps performed by the data server device 16.

Figure 3:
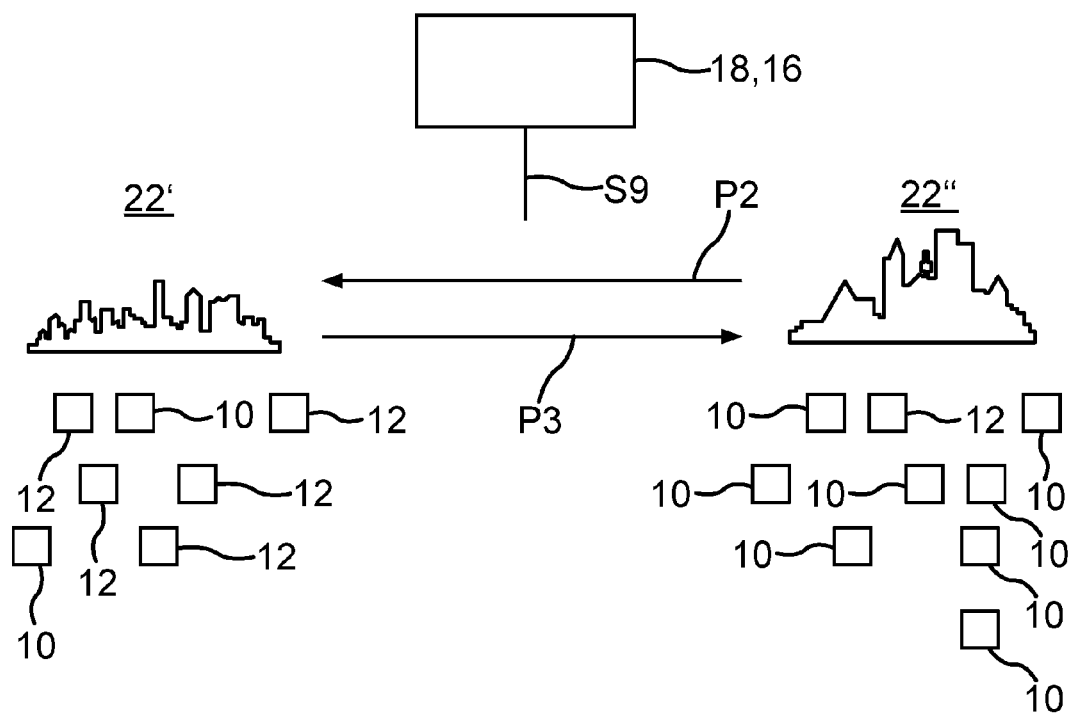
FIG. 3 shows a schematic view of another embodiment of the inventive method.

FIG. 3 schematically shows a further exemplary embodiment of the inventive method, wherein for example five motor vehicles 12 having a respective rainfall sensor and two motor vehicles 10 having a respective temperature sensor are located within a first geographic sector 22', such as a first city. In a further geographic sector 22", such as in another neighboring city, a motor vehicle 12 having a rain sensor and for example eight motor vehicles 10 having temperature sensors may be provided, for example.

If those are motor vehicles 10, 12 of a trucking company, for example, then the motor vehicles 10, 12 may be distributed for example by means of a coordination software of the processing device 18 in such a way that a required coverage is provided in both sectors 22', 22", i.e., for example, in that in the geographic sector 22' the number of motor vehicles 10 with temperature sensors and in geographic sector 22' the motor vehicles 12 with rain sensors may be respectively increased. The processing device 18 and/or the coordination software may then generate navigation signals, for example, and these may be transmitted to the respective motor vehicles 10, 12 (S9). For example, three motor vehicles 10 having a respective temperature sensor may be routed into sector 22' (P2) and for example two motor vehicles 12 having a respective rain sensor may be routed from sector 22' to sector 22" (P3).

The previous exemplary embodiments describe the principle of the inventive method for reducing the redundant sensor systems present in a vehicle fleet, for example.

According to a further embodiment, only individual motor vehicles 12 may be provided with a certain sensor system. This may transmit (S3) the sensor values, i.e. the measurement values as a sensor signal to the data server device 16, which may be used as a backend. From there, this sensor information is distributed to the other motor vehicles 10, 14. This is particularly efficient for fleet operators. Software may for example control in the backend, for example, which motor vehicles 10, 12 have to be dispatched to which site, in order to ensure the necessary regional coverage of all sensor devices 24, 28 over the entire fleet. Thus a considerable financial advantage regarding sensor costs for fleet vehicles may be obtained, among other things.

According to a further exemplary embodiment, the sensor system may also be mounted on all vehicles 10, 12, although it may only be activated for example if this is required by the data server device 16. Such a requirement may for example arise if an insufficient number of motor vehicles 10, 12 provided with the same sensor devices 24, 28 are traveling within the same geographic sector 22.

In this example, the operating life of the sensors is considerably increased, and/or a less expensive sensor system may be purchased.

According to a further embodiment, which may be described with reference to FIG. 2, a coordination software in the exemplary backend, i.e. in the data server device 16, may for example know all motor vehicles 10, 12, i.e. their respective configuration with reference to the sensor device 24, 28, and the current location of motor vehicles 10, 12. This software may also organize travel orders of the motor vehicles 10, 12, for example. Within the software component, the number of sensors available within each region may be stored, and by means of a database, it may be determined how many of those sensors are required for each region.

The motor vehicles 10, 12, which are provided with the sensor systems, i.e. the sensor device 24 or the sensor device 28, may determine the measurement values, such as a rain sensor may determine the current rainfall. This measurement value may then be transmitted to the backend, and in turn to the other motor vehicles 10, which may be distributed, for example, within a radius around each sensor.

The coordination software may also be responsible, for example, for the distribution of the motor vehicles 10, 12 according to the travel orders of a fleet in a way that at any time enough motor vehicles 10, 12 are available. If this is not the case, then, as shown in FIG. 3, motor vehicles 10, 12 may be programmed according to the travel orders in such a way that the required coverage of the sensors within the geographic sectors 22', 22" may be ensured or optimized.

The invention claimed is:

1. A method for assisting a user of a first motor vehicle with operation of the first motor vehicle, which is located in a geographic region, the method comprising:
    dividing the geographic region into a plurality of geographic sectors using a motor-vehicle-external data server device;
    detecting a measurement value using a sensor device of a second motor vehicle located in the geographic region;
    generating, by a control device of the second motor vehicle, a sensor signal that describes the measurement value and a current position of the second motor vehicle;
    transmitting the sensor signal to the motor-vehicle-external data server device;
    receiving, by the motor-vehicle-external data server device, a request signal from the first motor vehicle that includes a current position of the first motor vehicle and a requested sensor measurement that corresponds to the sensor signal generated by the second motor vehicle;
    determining, based on the current positions of the first and second motor vehicles, whether the first and second motor vehicles are located within a same geographic sector;
    transmitting, in response to the received request signal and the determining that the first motor vehicle and the second motor vehicle are located within the same geographic sector, a response signal to a control device of the first motor vehicle that includes the sensor signal;

determining a number of motor vehicles in one of the plurality of geographic sectors that are capable of detecting a measurement value of a same type as the requested sensor measurement;

generating, in response to the determined number of motor vehicles dropping below a predetermined minimum number, a control signal for controlling one of the number of motor vehicles to activate a sensor device for detecting the measurement value in order to increase the number of motor vehicles that are adapted for detecting the measurement value of the same type within the one of the plurality of geographic sectors; and transmitting the control signal to the one of the number of motor vehicles in order to cause the one of the number of motor vehicles to detect the measurement value.

2. The method of claim 1, further comprising:

detecting a measurement value of another type by a sensor device of the first motor vehicle;

generating, by a control device of the first motor vehicle, a sensor signal that describes the measurement value of the other type and a current position of the first motor vehicle;

transmitting the sensor signal to the motor-vehicle-external data server device;

receiving, by the motor-vehicle-external data server device, a request signal from the second motor vehicle, wherein the second motor vehicle, at a time of transmitting the request signal, is not prepared to detect the measurement value of the other type, and wherein the request signal describes a current position of the second motor vehicle; and transmitting the sensor signal to the control device of the second motor vehicle in response to determining that the first motor vehicle and the second motor vehicle are located within the same geographic sector.

3. The method of claim 1, wherein the dividing of the region into the plurality of geographical sectors occurs depending on a type of the measurement value, and wherein the type of the measurement value defines the size of the geographic sector.

4. The method of claim 3, wherein the data server device divides the region for each of the measurement values in a different way in response to receiving measurement values of different types from the motor vehicles.

5. The method of claim 1, wherein the dividing of the region into the plurality of geographic sectors is performed according to a geographic property of surroundings of the second motor vehicle and/or of a natural or artificial boundary of the surroundings with the determined property.

6. The method of claim 1, wherein the measurement value is a weather measurement value and the sensor signal is a weather signal, the method further comprising:

generating, by the data server device, in accordance with a type of the measurement value described by the sensor signal, a control signal for activating a windshield wiper and/or an air conditioning unit and/or a fog light; and transmitting, by the data server device, the control signal to the first motor vehicle.

7. A system, comprising:

a motor-vehicle-external data server device configured to divide a geographic region into a plurality of geographic sectors;

a second motor vehicle having a sensor device configured to detect at least one measurement value in a geographic region and a control device configured to generate a sensor signal that describes the measurement value and a current position of the second motor vehicle, the second motor vehicle configured to transmit the sensor signal to the motor-vehicle-external data server device; and a first motor vehicle configured to transmit a request signal to the motor-vehicle-external data server device that includes a current position of the first motor vehicle and a requested sensor measurement that corresponds to the sensor signal generated by the second motor vehicle;

wherein the motor-vehicle-external data server device is further configured to:

determine, based on the current positions of the first and second motor vehicles, whether the first and second motor vehicles are located within a same geographic sector, transmit, in response to the received request signal and a determination that the first motor vehicle and the second motor vehicle are located within the same geographic sector, a response signal to a control device of the first motor vehicle that includes the sensor signal, determine a number of motor vehicles in one of the plurality of geographic sectors that are capable of detecting a measurement value of a same type as the requested sensor measurement, generate, in response to the determined number of motor vehicles dropping below a predetermined minimum number, a control signal for controlling one of the number of motor vehicles to activate a sensor device to detect the measurement value in order to increase the number of motor vehicles that are adapted for detecting the measurement value of the same type within the one of the plurality of geographic sectors, and transmit the control signal to the one of the number of motor vehicles in order to cause the one of the number of motor vehicles to detect the measurement value.

* * * * *